(12) United States Patent
Toyohira et al.

(10) Patent No.: US 8,010,269 B2
(45) Date of Patent: Aug. 30, 2011

(54) BRAKE APPARATUS

(75) Inventors: Tomoya Toyohira, Saitama (JP); Arata Inoue, Saitama (JP); Kazuyoshi Akutsu, Saitama (JP); Kunimichi Hatano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 602 days.

(21) Appl. No.: 12/231,344

(22) Filed: Sep. 2, 2008

(65) Prior Publication Data

US 2009/0095100 A1    Apr. 16, 2009

(30) Foreign Application Priority Data

Oct. 11, 2007  (JP) .................................. 2007-265889

(51) Int. Cl.
*G06F 7/00*  (2006.01)

(52) U.S. Cl. .......... 701/70; 303/122; 303/152; 303/155; 303/900; 303/113.1; 60/547.1; 60/548; 60/555; 60/562; 60/578; 188/156; 188/79.56; 188/79.57; 188/79.58; 91/376 R; 701/78; 701/82; 701/83

(58) Field of Classification Search .................... 701/70, 701/78, 82, 83; 303/3, 50, 52, 9.64, 10, 87, 303/122, 152, 155, 900, 901, 113.1, 113.2, 303/113.3, 113.4, 113.5, 114.1, 114.3, 115.4, 303/116.1, 116.2, 119.1, 122.13; 60/547.1, 60/545, 548, 555, 562, 578, 581, 582, 585, 60/589, 591; 188/156, 79.56, 79.57, 79.58; 91/376 R See application file for complete search history.

(56) References Cited

U.S. PATENT DOCUMENTS

| | | | |
|---|---|---|---|
| 3,911,760 A | 10/1975 | Elbers et al. | |
| 4,395,072 A * | 7/1983 | Belart | 303/114.1 |
| 4,778,223 A * | 10/1988 | Inoue | 303/166 |
| 5,324,103 A * | 6/1994 | Iwata | 303/113.2 |
| 5,362,140 A * | 11/1994 | Burgdorf | 303/113.2 |
| 5,716,108 A * | 2/1998 | Asa et al. | 303/3 |
| 6,089,681 A * | 7/2000 | Watanabe | 303/158 |
| 6,135,578 A * | 10/2000 | Clar et al. | 303/114.3 |
| 6,604,795 B2 * | 8/2003 | Isono et al. | 303/11 |
| 2002/0084693 A1 | 7/2002 | Isono et al. | |

FOREIGN PATENT DOCUMENTS

| | | |
|---|---|---|
| EP | 1 219 516 A2 | 7/2002 |
| JP | 07-205776 | 8/1995 |
| JP | 11-105699 | 4/1999 |
| JP | 2006-151031 | 6/2006 |

* cited by examiner

*Primary Examiner* — James Trammell
*Assistant Examiner* — McDieunel Marc
(74) *Attorney, Agent, or Firm* — Carrier Blackman & Associates, P.C.; Joseph P. Carrier; William D. Blackman

(57) ABSTRACT

Brake apparatus includes a transmission unit for operatively connecting a brake pedal to a master cylinder, and the transmission unit is a mechanism capable of varying a ratio between an output amount of a push rod connected to a master cylinder and an operation amount of the brake pedal. Further, the transmission unit is constructed in such a manner that, in an initial operation region of the brake pedal, a ratio of the operation amount of the brake pedal to the output amount of the push rod is set to be greater than in another operation region immediately following the initial operation region.

3 Claims, 8 Drawing Sheets

BRAKE APPARATUS

FIELD OF THE INVENTION

The present invention relates to a vehicular brake apparatus including a simulator storing a brake fluid, supplied from a master cylinder, and a transmission unit interconnecting an operation member and the master cylinder.

BACKGROUND OF THE INVENTION

Among the conventionally-known vehicular braking apparatus are ones provided with a simulator (i.e., operation amount simulator) for securing good operating characteristics of a brake pedal. Such braking apparatus are known, for example, from Japanese Patent No. 3489453 (hereinafter referred to as "Patent Literature 1") and constructed in such a manner that a tread force or leg power is applied to (or caused to act on) a brake pedal, used as an operation member, so as to press a piston of a master cylinder and that a spring within the master cylinder is compressed by a fluid pressure produced within the master cylinder. With the spring within the master cylinder thus compressed, a reactive force acting on the brake pedal can be increased as a human driver presses on the brake pedal. In this way, the leg power can be adjusted in correspondence with a stroke of the brake pedal.

In the known braking apparatus, cup seals (seal members) are provided on the pistons within the master cylinder and simulator, for securing an appropriate sealing performance. These cup seals have their outer peripheral surfaces pressed against inner peripheral wall surfaces of the master cylinder and simulator. Because the outer peripheral surfaces of the cup seals are pressed against the inner peripheral wall surfaces of the master cylinder and simulator, the cup seals would produce sliding resistance when moving together with the master cylinder and simulator, and these sliding resistance acts on the brake pedal as a reactive force. Thus, in an initial operation phase or region, it becomes difficult for the pistons of the master cylinder and simulator to move, which would make it difficult to secure a good operational feeling of the brake pedal.

Further, from Japanese Patent No. 3269239 (hereinafter referred to as "Patent Literature 2"), for example, there have been known brake apparatus which are designed to enhance operability of the brake apparatus by varying a lever ratio (i.e., operation amount of the brake pedal/movement amount of a push rod) in correspondence with a stroke of the brake pedal (pedal stroke). With the brake apparatus disclosed in Patent Literature 2, the lever ratio is decreased, i.e. the movement amount of the push rod responsive to the brake pedal stroke is increased in an operation region where the braking force is small, to achieve characteristics that can facilitate stroke control. In an operation region where the braking force is great, on the other hand, the lever ratio is increased, i.e. the movement amount of the push rod responsive to the brake pedal stroke is decreased, to achieve characteristics that can facilitate leg power control. Brake pedal device of the brake apparatus disclosed in Patent Literature 2 is constructed in a manner as shown in FIG. 8 in order to decrease the lever ratio in a region where the braking force is small and increase the lever ratio in a region where the braking force is great.

Figure 8:
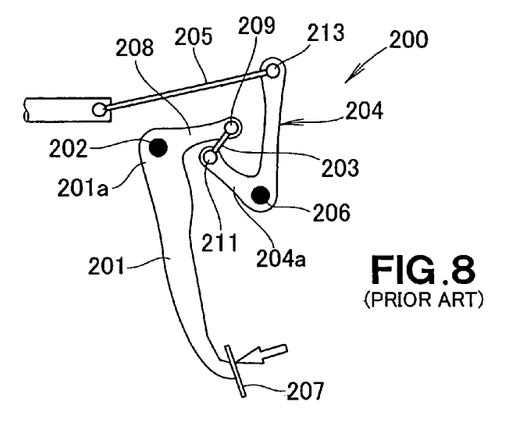
FIG. 8 is a side view of a conventionally-known brake pedal device.

FIG. 8 is a side view of the brake pedal device disclosed in Patent Literature 2. In the brake pedal device 200, a brake pedal 201 has an upper end portion 201a pivotably mounted to a vehicle body via a first pivot shaft 202, and the brake pedal 201 is connected to a push rod 205 via a connection link 203 and pivot link 204. As a leg power is applied to (acts on) a pedal 207 of the brake pedal 201 as indicated by a white arrow, the brake pedal 201 pivots clockwise about the first pivot shaft 202. The pivot link 204 is pivotably connected to the vehicle body via a second pivot shaft 206.

Figure 9A:
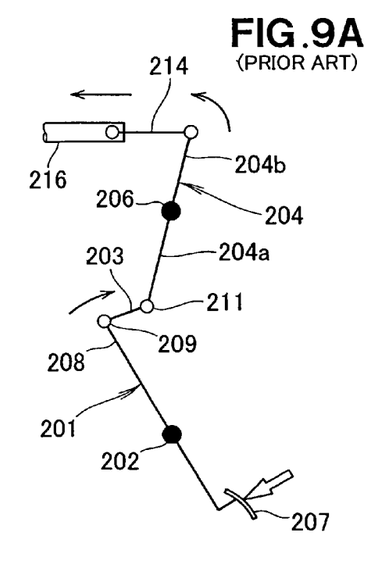
FIGS. 9A and 9B are views schematically showing behavior of the brake pedal device.
Figure 9B:
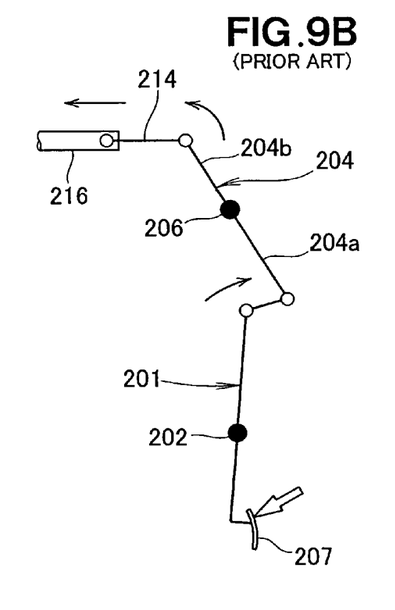

Behavior of the brake pedal device 200 can be schematically represented in a manner as shown in FIGS. 9A and 9B. Namely, in the schematic representation of FIGS. 9A and 9B, a leg power is applied to a pedal 207 of the brake pedal 201 as indicated by a white arrow, so that the brake pedal 201 pivots clockwise about the first pivot shaft 202. Then, a first connection arm 208 of the brake pedal 201 presses the connection link 203 as indicated by a clockwise arrow via a first connection pin 209. Also, the connection link 203 presses a first arm 204a of the pivot link 204 via a second connection pin 211, so that the pivot link 204 pivots counterclockwise about a second pivot shaft 206. Then, a second arm 204b of the pivot link 204 moves a push rod 214 via a third connection pin 213 as indicated by a leftward arrow, so that a piston 216 of a master cylinder moves as indicated by the leftward arrow.

Because the first connection arm 208 is arranged to press the connection link 203 via the first connection pin 209 as a leg power is applied to the brake pedal 207, the first connection arm 208 approaches and mechanically interfere with the first arm 204a as the pedal 207 is moved by the leg power to some degree (see FIG. 8). The first connection arm 208 thus interfering with the first arm 204a would prevent the brake pedal 207 from moving any further; namely, due to the interference, the human driver can not press on the brake pedal 207 any longer.

Figure 10:
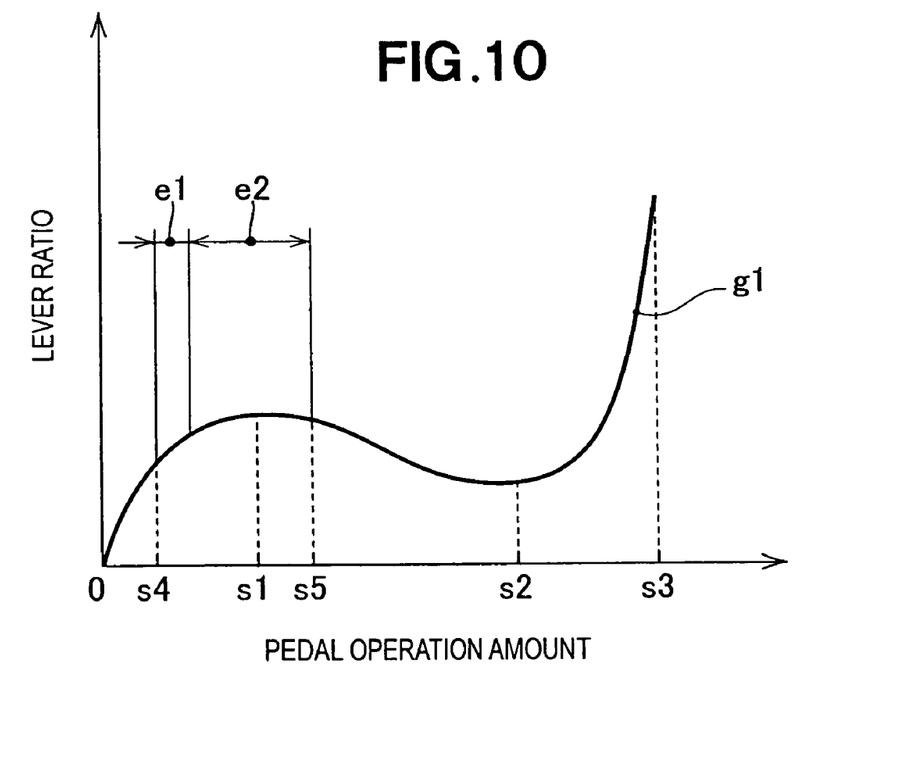
FIG. 10 is a graph showing relationship between a pedal operation amount and a lever ratio of the conventionally-known brake pedal device.

FIG. 10 is a graph showing relationship between a pedal operation amount and lever ratio in the conventionally-known brake pedal device, where the vertical axis represents the lever ratio while the horizontal axis represents the pedal operation amount. In a pedal operation amount region 0-s1, the lever ratio increases as the pedal operation amount increases, as indicated by a curve g1. In a pedal operation amount region s1-s2, the lever ratio decreases as the pedal operation amount increases. Further, in a pedal operation amount region s2-s3, the lever ratio increases as the pedal operation amount increases. According to the curve g1, the brake pedal device 200 is set to be used in a pedal operation amount region s4-s5. Thus, it is possible to decrease the lever ratio in an initial brake pedal operation region e1 where the braking force is small and increase the lever ratio in a following brake pedal operation region e2 where the braking force is greater.

In this case, the lever ratio has to be increased in the initial brake pedal operation region e1, in order to reduce the leg power in the initial brake pedal operation region e1. However, in the brake pedal device 200, the lever ratio is small in the initial brake pedal operation region e1, as indicated by the curve g1 of FIG. 10. Therefore, with the conventionally-known brake pedal device 200, it has been difficult to reduce the leg power in the initial brake pedal operation region. Further, because of the aforementioned interference between the connection arm 208 and the first arm 204a, the pedal 207 can be used or operated only within a range of (e1+e2) in the graph of FIG. 10; namely, the brake pedal stroke is limited to the (e1+e2) range.

SUMMARY OF THE INVENTION

In view of the foregoing prior art problems, it is an object of the present invention to provide an improved brake apparatus which can secure a good operational feeling of an operation member in an initial brake pedal operation region of the operation member by permitting reduction of an operating force to be applied to the operation member.

In order to accomplish the above-mentioned object, the present invention provides an improved brake apparatus, which comprises: an operation member; a brake cylinder; an electric braking-force control device for electrically controlling a braking force in accordance with an operation amount or force of the operation member; a master cylinder for producing a pressure of a brake fluid; a transmission unit for operatively connecting the operation member to the master cylinder; a simulator for storing the brake fluid supplied from the master cylinder; and a block member for blocking communication of the brake fluid between the master cylinder and the brake cylinder. The transmission unit is constructed as a mechanism capable of varying a ratio between an output amount of an output member thereof connected to the master cylinder and the operation amount of the operation member. In an initial operation phase or region of the operation member from an initial operating position to another operating position that corresponds to a predetermined operation amount of the operation member, a ratio of the operation amount of the operation member to the output amount of the output member is set to be greater than in another operation phase or region immediately following the initial operation region.

By increasing, via the transmission unit, the ratio (e.g., lever ratio) between the output amount of the output member and the operation amount of the operation member, it is possible to secure a great output (operating force) of the output member (e.g., push rod) for a given operating force applied to (or caused to act on) the operation member.

Among various known brake apparatus are ones where a negative-pressure servo device is provided between the transmission unit and the master cylinder. The negative-pressure servo device is capable of increasing the operating force by pressing an operating rod of the transmission unit to cancel the negative pressure to thereby allow a spring force to act on the negative-pressure. The negative-pressure servo device, employed in such known brake apparatus, includes an annular (ring-shaped) seal member provided on the operating rod of the transmission unit, to secure a sufficient air pressure. The air pressure produced in the negative-pressure servo device is smaller than a brake fluid pressure produced in a brake circuit of the apparatus. Therefore, sliding resistance of the seal member, produced as the operating rod of the transmission unit is operated, is relatively small. Further, the negative-pressure servo device includes a reaction force rubber member provided between the transmission unit and the master cylinder. By such small sliding force of the seal member and by the provision of the reaction force rubber member, the brake apparatus provided with the negative-pressure servo device can secure a good initial operating force of the operation member. However, the provision of the negative-pressure servo device requires not only a space for accommodating the servo device but also an increased number of component parts.

To avoid the aforementioned inconveniences, the transmission unit employed in the present invention is connected directly to the master cylinder without a negative-pressure servo device being provided between the transmission unit and the master cylinder. Thus, the present invention can eliminate the need for the accommodating the servo device and can reduce the number of component parts.

In an embodiment of the present invention, the transmission unit includes a pivot link connected via the output member to the master cylinder, and a connection link interconnecting the pivot link and the operation member. The connection link is arranged to be pulled away from the pivot link by the operation member as the operation member is operated in a non-operating position thereof Because the connection link is arranged to be pulled (rather than being pressed or pushed) by the operation member as the operation member is operated, it is possible to prevent the connection link from interfering with the operation member etc. Thus, in a latter-half operation amount region of the operation member, the lever ratio can be increased as the operation amount of the operation member increases. As a consequence, in case of a failure of a main power supply, for example, it is possible to increase the output (operating force) of the output member with respect to the operating force applied to the operation member. Thus, the present invention can increase the fluid pressure of the master cylinder and allows the brake cylinder to operate with the thus-increased fluid pressure.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
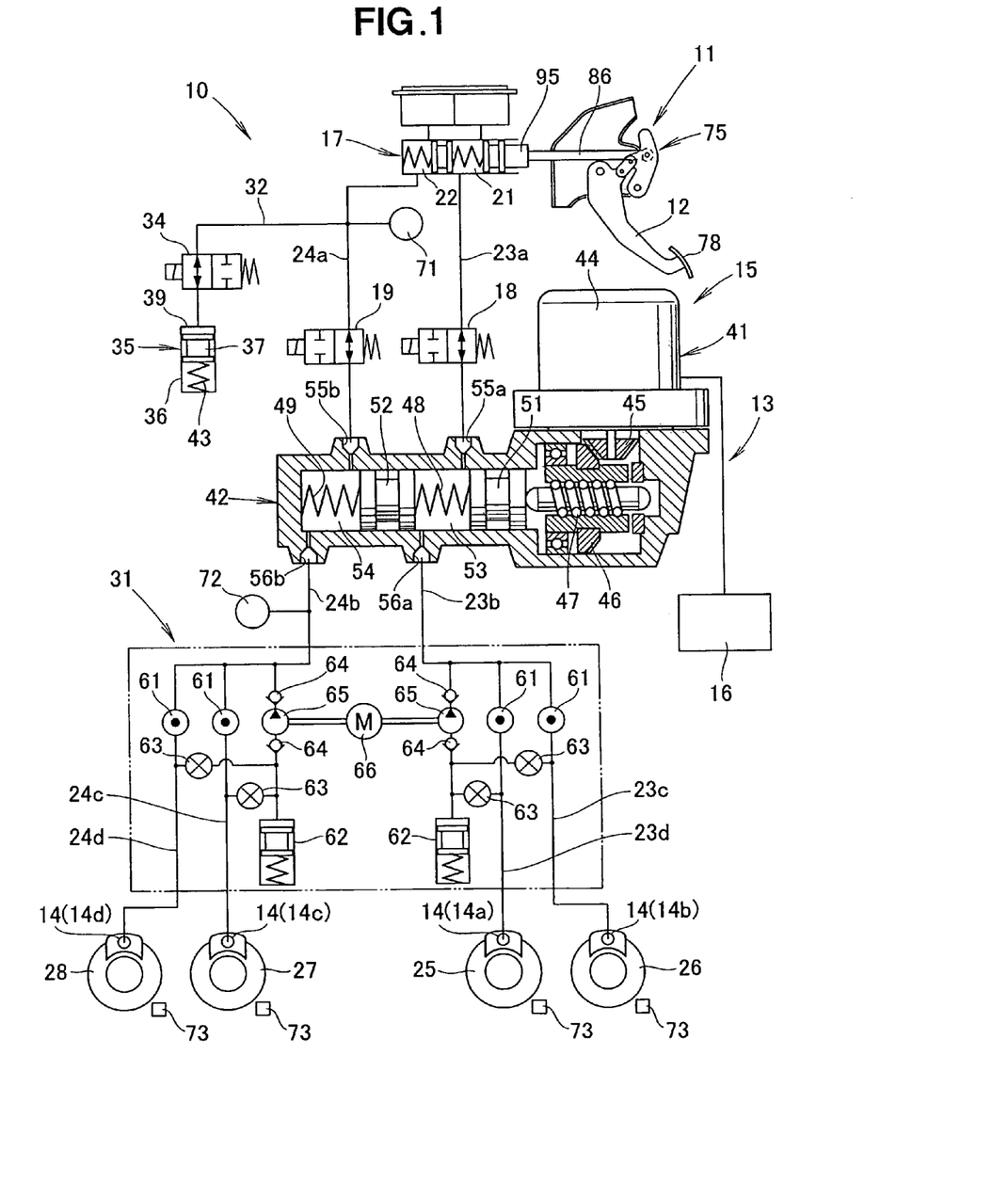
FIG. 1 is a diagram showing a fluid pressure circuit of a first embodiment of a brake apparatus of the present invention.

Reference is now made to FIG. 1 diagrammatically showing a fluid pressure circuit of a first embodiment of a brake apparatus of the present invention. The brake apparatus 10 includes: a brake pedal device 11 having an operation member in the form of a pendant-type brake pedal 12 incorporated therein, a plurality of brake cylinders 14 for applying a braking force to road wheels of a vehicle; an electric braking-force control device 13 capable of electrically controlling the braking force in accordance with an operation amount or leg power (operating force) of the brake pedal 12; a master cylinder 17 for producing a fluid pressure in response to operation of the brake pedal 12; an operation amount simulator for storing a brake fluid supplied form the master cylinder 17; and a pair of block valves (block members) 18 and 19 for blocking communication of the brake fluid between the master cylinder 17 and the brake cylinders 14. The electric braking-force control device 13 includes an electric braking-force production section 15 and a control section 16, as will be later described.

The brake cylinders 14 will be described below as comprising brake cylinders 14a and 14b for left and right front wheels and brake cylinders 14c and 14d for left and right rear wheels. The brake pedal device 11 will be detailed below with reference to FIGS. 3-5.

The master cylinder 17 is a tandem-type cylinder comprising two first fluid pressure chambers 21 and 22 for producing a fluid pressure corresponding to a leg power with which a human driver of the vehicle presses on the brake pedal 12. One of the first fluid pressure chambers 21 is connected, via fluid paths 23a, 23b, 23c and 23d, to the brake cylinders 14a and 14b of disk brake devices 25 and 26 of the left front wheel and right rear wheel. The other first fluid pressure chamber 22 is connected, via fluid paths 24a, 24b, 24c and 24d, to the brake cylinders 14c and 14d of disk brake devices 27 and 28 of the right front wheel and left rear wheel.

One of the block valves 18, which is a normally-open electromagnetic valve, is provided in an intermediate portion of the fluid path 23a, and the other block valve 19, which is also a normally-open electromagnetic valve, is provided in an intermediate portion of the fluid path 24a. Further, the electric braking-force production section 15 of the electric braking-force control device 13 is provided between the fluid paths 23a and 23b and between the fluid paths 24a and 24b.

Further, an ABS (Antilock Brake System) device 31 is provided between the electric braking-force production section 15 and the disk brake devices 25-28. The operation amount simulator 35 is provided in a fluid path 32 branching from the fluid path 24a, via a reactive-force permitting valve 34 that is a normally-closed electromagnetic valve. The operation amount simulator 35 will be detailed later with reference to FIG. 2.

The operation amount simulator 35 includes an actuator 41 and a cylinder body 42, and it is capable of electrically controlling the braking force in accordance with the operation amount or leg power (operating force) of the brake pedal 12. The actuator 41 includes a driving bevel gear 45 mounted on an output shaft of an electric motor 44, a driven bevel gear 46 meshing with the driving bevel gear 45, and a ball screw mechanism 47 driven by the driven bevel gear 46.

Pistons 51 and 52 are slidably fitted in the cylinder body 42 and normally urged by respective return springs 48 and 49 in its returning or retreating direction. A pair of second fluid pressure chambers 53 and 54 are defined in front of respective ones of the pistons 51 and 52. One of the second fluid pressure chambers 53 communicates with the fluid path 23a via a port 55a and communicates with the fluid path 23b via a port 56a. The other second fluid pressure chambers 54 communicates with the fluid path 24a via a port 55b and communicates with the fluid path 24b via a port 56b.

In the electric braking-force production section 15, the pistons 51 and 52 advance or move forward, via the driving bevel gear 45, driven bevel gear 46 and ball screw mechanism 47, through activation of the electric motor 44. By such forward movement of the pistons 51 and 52, the ports 55a and 55b communicating with the fluid paths 23a and 24a are closed, so that a fluid pressure is produced in the second fluid pressure chambers 53 and 54. The thus-produced fluid pressure is delivered to the fluid path 23b via the port 56a and to the fluid path 24b via the port 56b.

The ABS device 31 has two channels of a same construction, one of which is provided for the disk brake devices 25 and 26 of the left front wheel and right rear wheel and the other of which is provided for the disk brake devices 27 and 28 of the right front wheel and left rear wheel. Thus, the following paragraphs representatively describe only one of the channels of the ABS device 31 which is provided for the disk brake devices 25 and 26 of the left front wheel and right rear wheel.

The one channel of the ABS device 3 provided for the disk brake devices 25 and 26 of the left front wheel and right rear wheel includes input valves 61 in the form of a pair of normally-open electromagnetic valves, and output valves 63 in the form of a pair of normally-closed electromagnetic valves disposed between the input valves 61 and a reservoir 62. Fluid pressure pump 65 is sandwiched by a pair of check valves 64 between the reservoir 62 and the fluid path 23b, and this fluid pressure pump 65 is driven via an electric motor 66.

The control section 16 is provided for controlling the block valves 18 and 19, reactive-force permitting valve 34, electric braking-force production section 15 and ABS device 31. The control section 16 receives a signal corresponding to an operation amount or leg power of the brake pedal 12 and electrically controls the electric braking-force production section 15 on the basis of the received signal.

To the control section 16 are connected a fluid pressure sensor 71 for detecting a fluid pressure produced by the master cylinder, a fluid pressure sensor 72 for detecting a fluid pressure delivered to the disk brake devices 25 and 26, and wheel speed sensors 73 for detecting speeds of the individual wheels.

Figure 2:
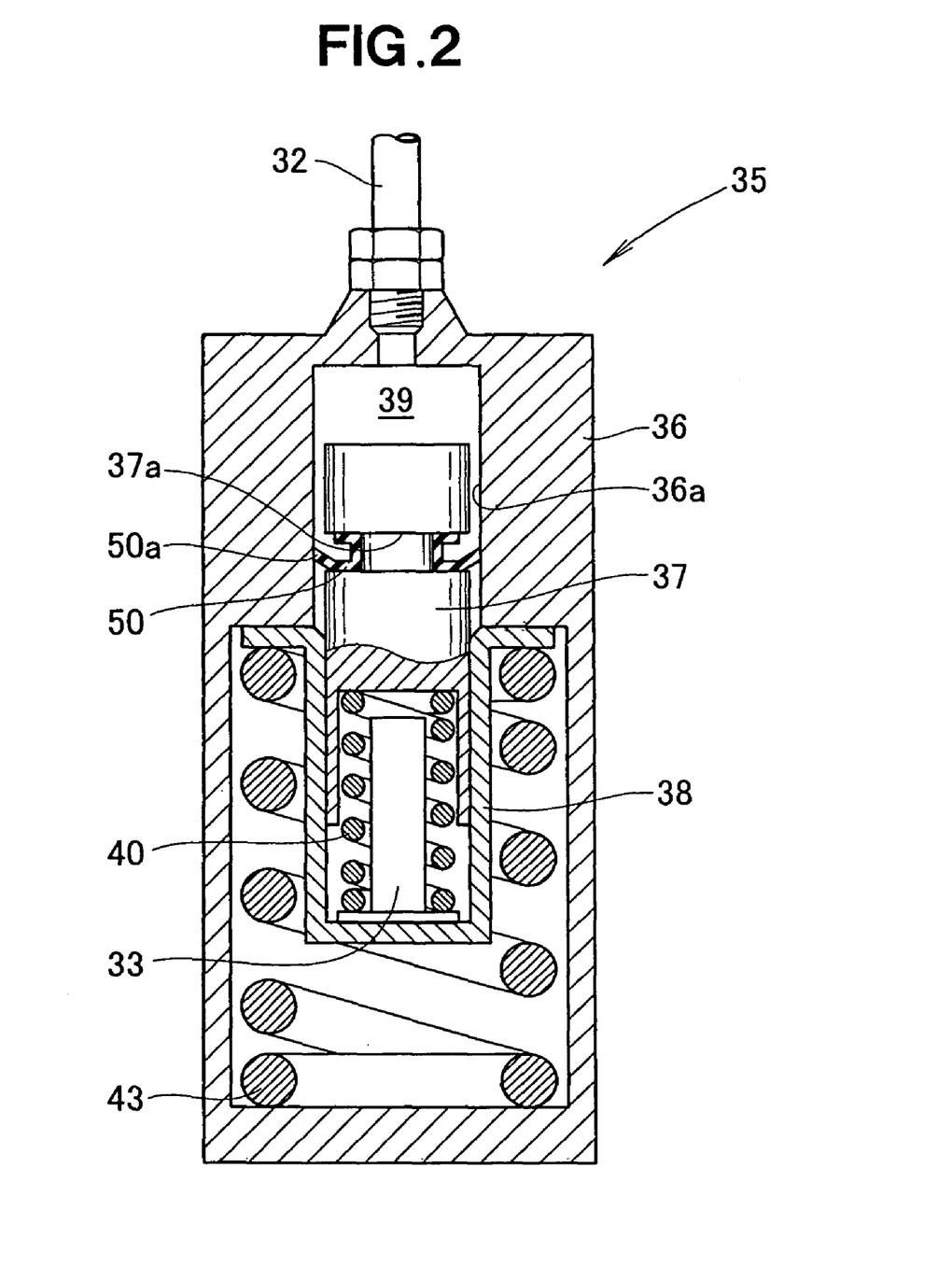
FIG. 2 is a sectional view showing an operation amount simulator employed in the first embodiment of the brake apparatus.

FIG. 2 is a sectional view of the operation amount simulator employed in the first embodiment of the brake apparatus. The operation amount simulator 35 includes a first piston 37 slidably mounted in a cylinder 36, a second piston 38 slidably fitted over the first piston 37, a stopper member 33 and first spring 40 provided in the second piston 38, a second spring 43 provided in the cylinder 36, and a cup seal (seal member) 50 fitted in an annular groove 37a of the first piston 37.

Further, in the operation amount simulator 35, the first piston 37 is normally urged upward by the first spring 40, the second piston 38 is normally urged upward by the second spring 43, and a fluid chamber 39 is formed by the cup seal 50 in a portion of the cylinder 36 opposite from the spring 40.

The first spring 40 has a spring constant smaller than the second spring 43. Further, the fluid chamber 39 communicates with the fluid path 32 so that the fluid chamber 39 is filled with the brake fluid.

Leg power acts on the brake pedal 12 shown in FIG. 1, and a pressure of the brake fluid produced by the master cylinder 17 acts on the fluid chamber 39. The brake fluid pressure produced by the master cylinder 17 (and hence a brake fluid pressure in the fluid chamber 39) increases as the leg power applied to the brake pedal 12 increases. As the fluid pressure increases in the fluid chamber 39, the first and second pistons 37 and 38 move downward against the urging forces of the first and second springs 40 and 43.

The following paragraphs describe behavior of the brake apparatus 10 with primary reference to FIG. 1. As the human operator operates the brake pedal 12 by applying a leg power (operating force) to the brake pedal 12, the block valves 18 and 19 each in the form of a normally-open electromagnetic valve are demagnetized, and the reactive-force permitting valve 34 in the form of a normally-closed electromagnetic valve is excited to be opened.

Then, the fluid pressure sensor 71 provided in the fluid path 24a detects the pressing-on of the brake pedal 12, and the actuator 41 of the electric braking-force production section 15 is activated, in response to a pressing-on detection signal output from the fluid pressure sensor 71, so that the pistons 51 and 52 move forward.

By such forward movement of the pistons 51 and 52, a fluid pressure is produced in the second fluid pressure chambers 53 and 54. The thus-produced fluid pressure is delivered to the brake cylinders 14a, 14b, 14c and 14d of the disk brake devices 25, 26, 27 and 28 by way of the opened input valves 61 of the ABS device 31 to thereby brake the individual wheels.

As the pistons 51 and 52 of the electric braking-force production section 15 move forward slightly, the ports 55a and 55b are closed with the pistons 51 and 52, so that not only the communication between the liquid path 23a and the second fluid pressure chamber 53 but also the communication between the liquid path 24a and the second fluid pressure chamber 54 is interrupted. Thus, the fluid pressure produced in the master cylinder 17 is prevented from being delivered to the disk brake devices 25, 26, 27 and 28.

At that time, the fluid pressure produced in the other first fluid pressure chamber 22 of the master cylinder 17 is delivered to the fluid chamber 39 of the operation amount simulator 35 by way of the reactive-force permitting valve 34. The first and second pistons 37 and 38 of the operation amount simulator 35 are moved by the delivered fluid pressure against the biasing forces of the first and second springs 40 and 43 (see FIG. 2 for the second piston 38 and the first spring 40).

In this way, not only an operation amount of the brake pedal 12 is permitted but also a simulated reactive force of the brake pedal 12 can be created, so that an uncomfortable feeling of the human driver can be eliminated. Note that relationship between the operation of the brake pedal 35 and the leg power of the brake pedal 12 will be described later with reference to FIGS. 5 and 6 etc.

The operation of the actuator 41 of the electric braking-force production section 15 is controlled so that the fluid pressure of the section 15 detected by the fluid pressure sensor 72 takes a level corresponding to the fluid pressure of the master cylinder 17, detected by the fluid pressure sensor 71, when the communication between the paths 23a, 24a and the second fluid pressure chambers 53, 54 is blocked. Through this control, a braking force corresponding to the leg power applied to the brake pedal 12 is produced in the disk brakes 25, 26, 27 and 28.

It is possible that, during the braking operation of the brake apparatus 10, some of the wheels will present an increased slip ratio to get into a "lock tendency". In this case, that the wheel has gotten into a lock tendency is detected on the basis of the output of the wheel speed sensors 73.

When such a wheel lock tendency has been detected, not only the block valves 18 and 19, each in the form of a normally-open electromagnetic valve, are excited to be closed but also the electric braking-force production section 15 is kept in an operating state to keep activating the ABS device 31, to thereby avoid the locking of the wheel.

Namely, once some of the wheels gets into a lock tendency, the input valve 61 leading to the brake cylinder 14a, 14b, 14c, 14d of the wheel is closed to interrupt the delivery of the fluid pressure from the electric braking-force production section 15. In this condition, the outlet valve 63 is opened to allow the fluid pressure of the brake cylinder 14a, 14b, 14c, 14d to escape to the reservoir 62, to thereby reduce the fluid pressure.

Then, the output valve 63 is closed to retain the fluid pressure of the brake cylinder 14a, 14b, 14c, 14d, to thereby reduce the braking force to prevent the wheel from being locked.

Thus, the wheel speed is recovered, so that the slip ratio decreases. Once the slip ratio decreases, the input valve 61 is opened to increase the fluid pressure of the brake cylinder 14a, 14b, 14c, 14d, to thereby increase the braking force.

Then, once some of the wheels gets into a lock tendency due to an increase in the fluid pressure, the aforementioned reduction, retention and increase of the fluid pressure is repeated. Through such repetition of the reduction, retention and increase of the fluid pressure, the instant embodiment produces a greatest possible braking force while appropriately controlling locking of the wheels. The brake fluid having flown into the reservoir 62 during the repetition of the reduction, retention and increase of the fluid pressure is returned to the immediately-upstream liquid path 23b or 24b.

During control by the ABS device 31, the block valves 18 and 19 are maintained in the closed state. In this way, it is possible to prevent a fluid pressure change, caused by the operation of the ABS device 31, from being delivered as kickback from the master cylinder 17 to the brake pedal 12.

In hybrid vehicles provided with an electric motor for running the vehicle and electric-powered vehicles, the following control is performed to permit cooperation between the fluid pressure control and regenerative braking.

Namely, when it has been determined that the regenerative braking is possible with the brake pedal 12 pressed on, the electric braking-force production section 15 is deactivated and the regenerative braking is prioritized over the fluid pressure control, so that an energy recovery efficiency can be enhanced.

During-execution of the regenerative braking, the ports 55a and 55b of the electric braking-force production section 15 are kept opened. Thus, the block valves 18 and 19 are switched to the closed state so that the fluid pressure produced in the master cylinder 17 can be prevented from being delivered to the brake cylinders 14a, 14b, 14c and 14d.

Note that, when any of the wheels has gotten into a lock tendency during execution of the regenerative braking, the regenerative braking is terminated and switching is made to the control by the ABS device 31.

Figure 3:
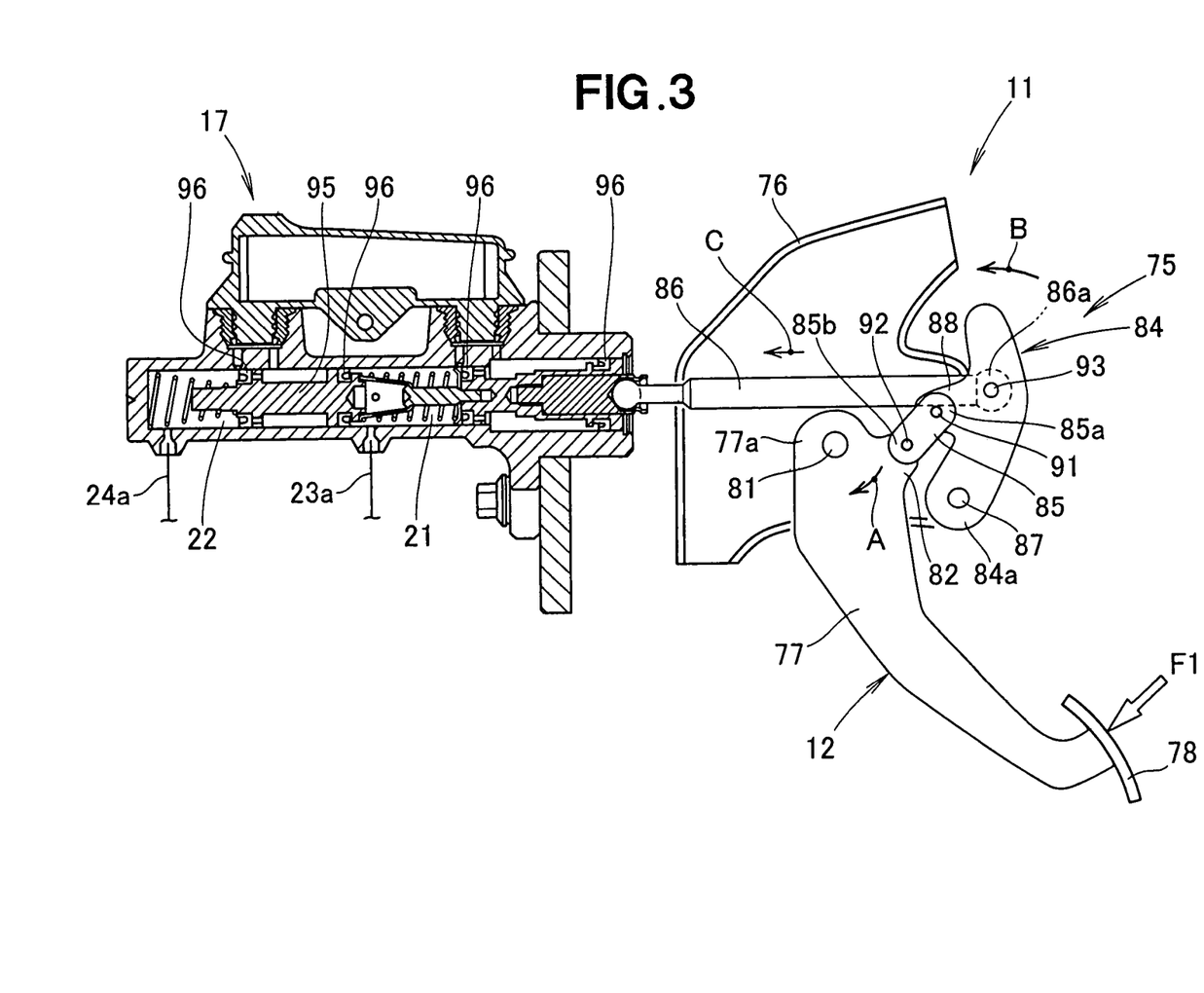
FIG. 3 is a side view showing a brake pedal device employed in the first embodiment of the brake apparatus.

FIG. 3 is a side view showing the brake pedal device 11 in the first embodiment of the brake apparatus of the present invention. The brake pedal device 11 includes the brake pedal 12 operable by the human driver applying thereto a leg power, and a transmission unit 75 interconnecting the brake pedal 12 and the master cylinder 17. In the master cylinder 17, cup seals (seal members) 96 are mounted on a piston 95.

The brake pedal 12 includes a lever section 77 pivotably connected to a mounting bracket 76, and a pedal 78 fixed to a lower end portion of the lever section 77. The lever section 77 has an upper end portion 77a pivotably connected via a first pivot shaft 81 to the mounting bracket 76, and it has an upper arm 82 adjoining the upper end portion 77a. The mounting bracket 76 is a member fixed to a vehicle body.

The transmission unit 75 includes a pivot link 84 pivotably connected to the mounting bracket 76, a connection link 85 connecting the pivot link 84 to the upper arm 82 of the lever section 77, and a push rod (output member) 86 connected to the pivotal link 84.

The pivot link 84 has a lower end portion 84a pivotably connected to the pivot link 84 via a second pivot shaft 87. The connection link 85 has one end portion 85a pivotably connected to a middle arm 88 of the pivot link 84 via a first connection pin 91. The connection link 85 has another end portion 85b pivotably connected to the upper arm 82 via a second connection pin 92.

The push rod 86 has a rear end portion 86a pivotably connected, via a third connection pin 93, to a portion of the pivot link 84 near the middle arm 88. The push rod 86 is connected to the piston 95 of the master cylinder 17. Namely, the pivot link 84 is connected to the piston 95 of the master cylinder 17 via the push rod 86 and third connection pin 93.

Behavior of the brake pedal device 11 can be schematically represented in a manner as shown in FIGS. 4A-4D. Namely, FIGS. 4A-4D show a modeled brake apparatus (i.e., modeled version of the brake pedal device) 101, in which are used the same reference numerals and characters as used for the brake pedal device 11.

Figure 4A:
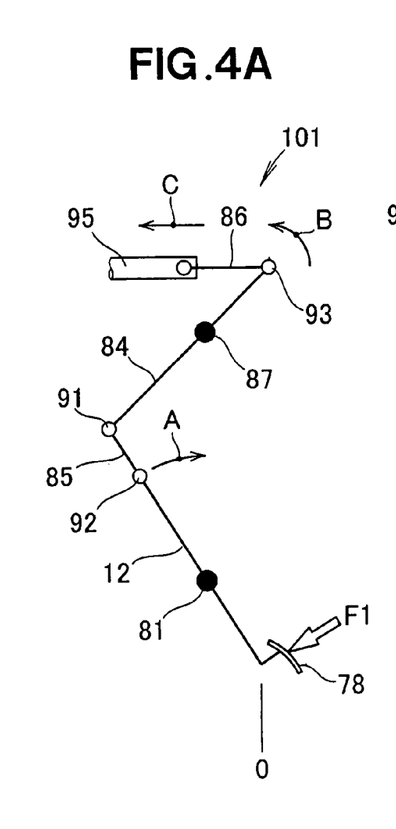
FIGS. 4A-4D are views schematically showing behavior of the brake pedal device.
Figure 4B:
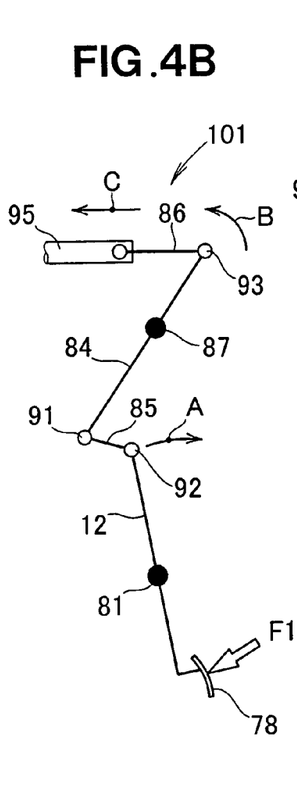
Figure 4C:
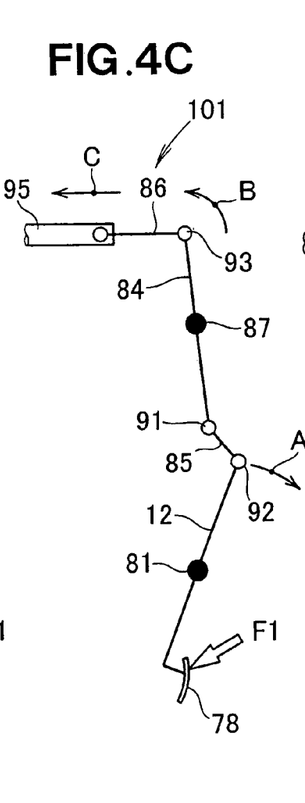

Leg power F1 is applied to (acts on) the pedal 78 of the brake pedal 12, so that the brake pedal 12 pivots clockwise about the first pivot shaft 81. More specifically, as shown in FIGS. 4A and 4B, the brake pedal 12 pivots in the clockwise direction in a pedal operation amount region 0-S3 of FIG. 5.

As the brake pedal 12 pivots in the clockwise direction as noted above, it strongly pulls the connection link 85 (rather than pressing the connection link 85), in a direction away from the pivot link 84, via the second connection pin 92 as indicated by arrow A. By being thus pulled, the connection link 85 does not interfere with the brake pedal 12 during human driver's operation of the brake pedal 12. In response to the pivotal movement, in the arrow A direction, of the connection link 85, the pivot link 84 is pulled (rather than being pressed) by the connection link 85 to pivot in the counterclockwise direction about the second pivot shaft 87 as indicated by arrow B.

In response to the pivotal movement, in the arrow B direction, of the pivot link 84, the push rod 86 moves as indicated by arrow C, so that the piston 95 of the master cylinder 17 moves in the arrow C direction. Hereinbelow, an amount of the movement (i.e., output amount) of the push rod 86 will be referred to as "push rod output amount".

As set forth above, the modeled brake pedal device 101 is constructed as a link mechanism which, in response to human driver's operation of the brake pedal 12 in the operation amount region 0-S3, pivots the pivot link 84 by pulling (rather than pressing) the connection link 85 as indicated by arrow A to thereby pull the pivot link 84.

Namely, the modeled brake pedal device 101 pulls the connection link 85 and pivot link 84 in response to an operating force applied to the brake pedal 12. In other words, the connection link 85 is arranged to be pulled by the brake pedal 12 as the brake pedal 12 is operated by the human driver. In this way, in the operation amount region 0-S3, it is possible to avoid unwanted interference between the brake pedal 12, connection link 85, pivot link 84, etc. Because such interference can be avoided, the instant embodiment permits free selection of a desired usage or operating range (i.e., stroke) of the brake pedal 12.

Figure 5:
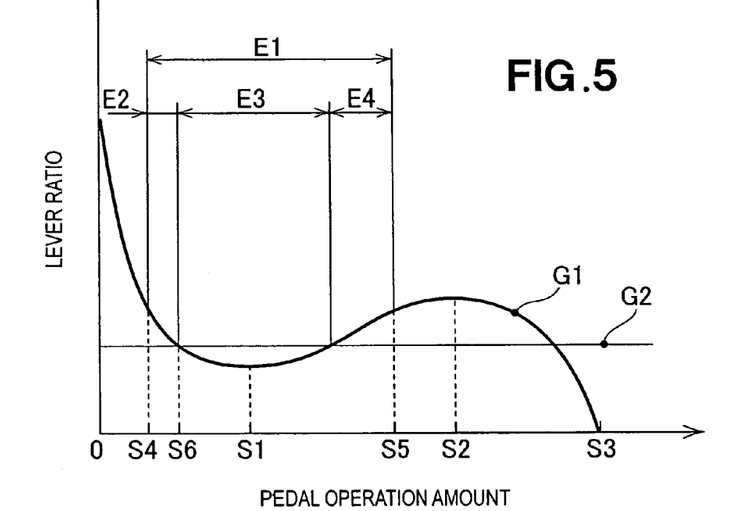
FIG. 5 is a graph showing relationship between a pedal operation amount and a lever ratio of the brake pedal device in the first embodiment of the brake apparatus.

FIG. 5 is a graph showing relationship between the pedal operation amount and the lever ratio in the first embodiment of the brake apparatus, where the vertical axis represents the lever ratio while the horizontal axis represents the pedal operation amount. The lever ratio is a ratio of the operation amount of the brake pedal to the output amount (push rod output amount) of the push rod 86 connected to the master cylinder 17.

Namely, the lever ratio=the brake pedal operation amount/the push rod output amount.

Where the lever ratio is great, the output (operating amount or pressing force) of the push rod 86 responsive to a leg power applied to the brake pedal 12 becomes great, so that the fluid pressure in the master cylinder 17 can be increased. Where the lever ratio is small, the output (pressing force) of the push rod 86 responsive to a leg power applied to the brake pedal 12 becomes small.

Figure 4D:
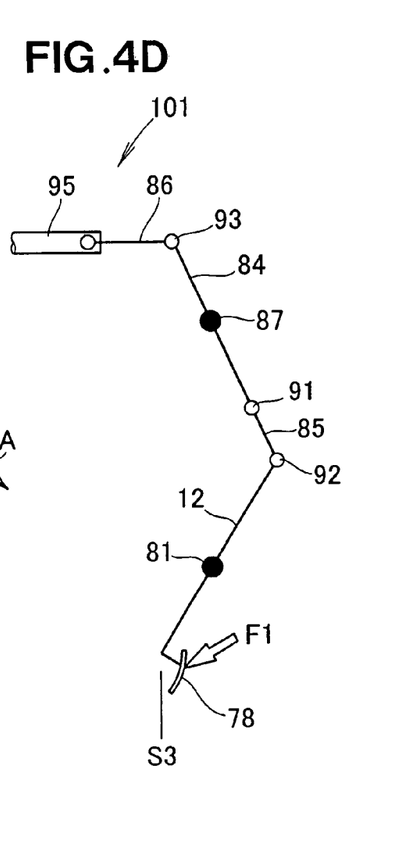

In the instant embodiment, the pedal operation amount varies from the zero amount, corresponding to the position shown in FIG. 4A, to the amount S3 corresponding to the position shown in FIG. 4D.

In a pedal operation amount region 0-S1, the lever ratio decreases as the pedal operation amount increases, as indicated by a curve G1. In a pedal operation amount region S1-S2, the lever ratio increases as the pedal operation amount increases. Further, in a pedal operation amount region S2-S3, the lever ratio decreases as the pedal operation amount increases. Namely, the transmission unit 75 employed in the brake apparatus of the present invention is a mechanism capable of varying the lever ratio through changes in angular and positional relationship between the pivot link 84 and the connection link 85 responsive to the movement of the brake pedal 12. In other words, the link mechanism of the transmission unit 75 is constructed to vary the lever ratio in response to movement, by the human driver, of the brake pedal 12.

According to the curve G1 in FIG. 5, the brake pedal device 11 is set to be used in a pedal operation amount region E1 (i.e., S4-S5). Namely, in this case, the pedal operation amount S4 is an initial position, i.e. operation start position, of the brake pedal device 11.

With the pedal operation amount of the brake pedal device 11 set in the region E1 as set forth above, the lever ratio (i.e., ratio of the operation amount of the brake pedal to the push rod output amount) in an initial operation region E2 from the initial position S4 to another position S6, corresponding to a predetermined operation amount, of the brake pedal 12 can be made greater than in a mid operation region E3 immediately following the initial operation region E2.

By thus setting a greater lever ratio in the initial operation region E2 of the brake pedal 12 as noted above, the instant embodiment can increase the output (pressing force) of the push rod 86 to thereby increase the fluid pressure in the master cylinder 17.

As set forth above, the brake pedal device 11 shown in FIG. 3 is constructed to be pulled by the brake pedal 12 in response to human operator's operation of the brake pedal 12 in the entire operation amount region 0-S3. Namely, the connection link 85 is arranged to be pulled away from the pivot link 84 by the brake pedal 12 as the brake pedal 12 is operated by the human driver at the initial position S4. In this way, in the operation amount region E1 (S4-S5), it is possible to avoid unwanted interference between the various component parts, such as the brake pedal 12, connection link 85 and pivot link 84 of FIG. 3, during operation of the brake pedal device 11.

Thus, in a latter-half operation amount region of the brake pedal 12, the lever ratio can be increased as the operation amount of the brake pedal 12 increases. As a consequence, in case of a failure of a main power supply, for example, it is possible to increase the output (operating force) of the push rod 86 with respect to the operating force applied to the brake pedal 12. Thus, the instant embodiment can increase the fluid pressure of the master cylinder 17 and allows the brake cylinders to operate with the thus-increased fluid pressure.

In addition, by permitting variation in the lever ratio of the brake pedal device 11 shown in FIG. 3, the instant embodiment can increase the lever ratio in the initial operation region E2 while keeping the pedal operation amount region E1 (i.e., entire stroke of the brake pedal 12) at an appropriate length by, for example, changing the length of the connection link 85 or using a desired one of connection links 85 of different lengths.

Next, with reference to FIGS. 2, 5, 6, etc., a description will be given about relationship between the leg power applied to the brake pedal 12 of the brake apparatus 10 and the piston stroke of the operation amount simulator 35.

Figure 6:
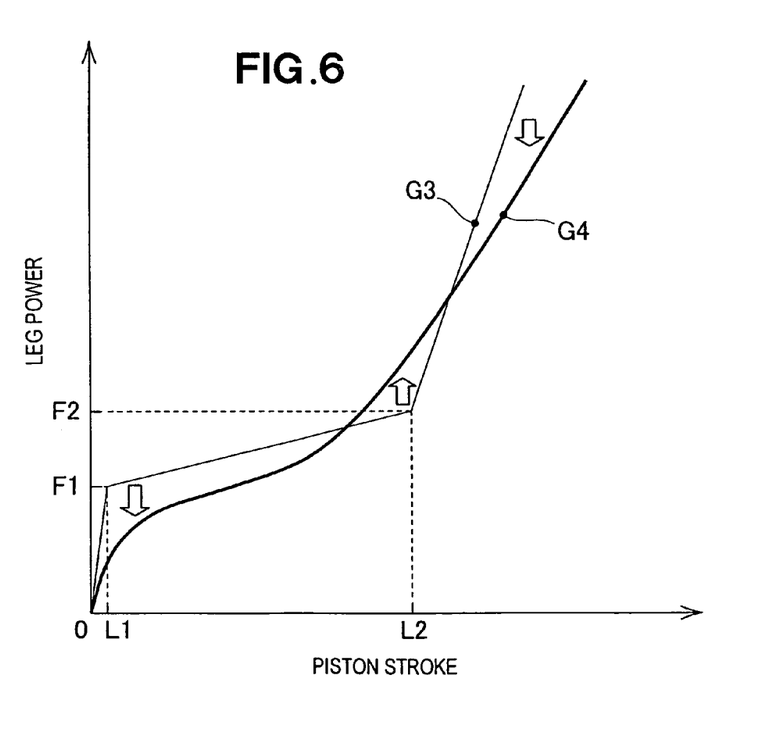
FIG. 6 is a graph showing relationship between a leg power applied to a brake pedal and a piston stroke of the operation amount simulator in the first embodiment of the brake apparatus.

FIG. 6 is a graph showing relationship between the leg power applied to the brake pedal 12 of the brake apparatus 10 and the piston stroke of the operation amount simulator 35, where the vertical axis represents the leg power applied to the brake pedal 12 while the horizontal axis represents the piston stroke of the operation amount simulator 35.

In FIG. 6, a curve G3 shows, as a comparative example, a G2 of FIG. 5 that indicates a constant lever ratio of the brake pedal device 11. Curve G4 shows, as an inventive example, the curve G1 of FIG. 5 that shows the variable lever ratio employed in the instant embodiment of the brake apparatus.

According to the graph G1 (representing the inventive example), as shown in FIG. 5, the lever ratio is greater than that indicated by the curve G2 (representing the comparative example) in the initial operation region E2, smaller than that indicated by the curve G2 in the mid operation region E3, and greater than that indicated by the curve G2 in a final operation region E4.

First, the comparative example will be explained on the basis of the graph G3 shown in FIG. 6. Leg power from the human driver acts on the brake pedal 12, so that the pressure of brake fluid produced by the master cylinder 17 acts on the fluid chamber 39 (see FIG. 2) of the operation amount simulator 35 in the first embodiment of the brake apparatus. The brake fluid pressure produced by the master cylinder 17 (and hence the fluid pressure in the fluid chamber 39) increases as the leg power increases.

At that time, the fluid pressure acts on the first fluid pressure chambers 21 and 22 of the master cylinder 17 shown in FIG. 3, so that the outer peripheries of the cup seals 96 are pressed against the inner peripheral wall surface of the master cylinder 17. Thus, if a force acts on the cup seals 96 to move the seals 96 together with the piston 95, relatively great sliding resistance would act on the outer peripheries of the cup seals 96.

Further, the fluid pressure acts on the cup seal 50 mounted on the first piston 37 of the operation amount simulator 35, so that the outer periphery 50a (see FIG. 2) of the cup seal 50 is pressed against the inner peripheral wall surface 36a of the cylinder 36. Thus, if a force acts on the cup seal 50 to move the seal 50 together with the piston 37, relatively great sliding resistance would act on the outer periphery 50a of the cup seal 50.

Hereinbelow, a combination of the sliding resistance of the cup seals 96 and 50 will be referred to as "cup seal sliding resistance".

According to the comparative example, the lever constant is constant as indicated by the graph G2 of FIG. 5. Thus, the lever ratio is kept relatively low in order to reduce the entire stroke of the brake pedal 12 to a desired length. Therefore, when the leg power applied to the brake pedal 12 is small as in the initial operation region E2, the output (pressing force) of the push rod 86 shown in FIG. 3 is also small. Consequently, no fluid pressure sufficient for moving the first piston 37 can be produced in the fluid chamber 39.

Namely, when the human driver applies a leg power to the brake pedal 12 in the initial operation region E2, the first piston 37 moves little until the leg power increases up to a level F1 (more specifically, the first piston 37 moves only slightly from "0" to "L1" with the cup seal 50 elastically deformed), as shown by the curve G3 of FIG. 6.

Then, once the leg power increases up to the level F1, the output (pressing force) of the push rod 86 shown in FIG. 3 too becomes great. As a consequence, the fluid pressure of the fluid chamber 39 increases, which causes the first piston 37 to start moving against the cup seal sliding resistance, biasing force of the first spring 40, etc.

As the leg power increases from F1 to F2, the fluid pressure of the fluid chamber 39 increases, so that the first piston 37 moves from a position L1 to a position L2 at a relatively high speed. Once the first piston 37 moves to the position L2, it abuts against the stopper member 33 (see FIG. 2).

As the leg power increases from F2 in the aforementioned condition, the fluid pressure of the fluid chamber 39 increases, which causes the first and second pistons 37 and 38 to move from the position L2 relatively slowly against the cup seal sliding resistance, biasing force of the first spring 40, etc.

With the comparative example represented by the graph G3 shown in FIG. 6, where the lever constant is constant, the first piston 37 does not start moving before the leg power increases to the level F1 even if the human driver applies a leg power to the brake pedal 12.

Further, when the first piston 37 is to be switched to the state where it is movable against the biasing forces of the first spring 40 and second spring 43, the first and second pistons 37 and 38 can not be moved smoothly because the moving speed of the first piston 37 varies relatively greatly. Thus, it would be difficult for the brake apparatus employing the comparative example to secure a good operational feeling of the brake pedal 12.

Next, the inventive example will be explained on the basis of the curve G4 shown in FIG. 6. With the inventive example, the lever ratio is variable as indicated by the curve G1 of FIG. 5. Namely, the lever ratio in the inventive example is greater than the lever ratio in the comparative example in the initial operation region E2 and final operation region E4, but smaller than the lever ratio in the comparative example in the mid operation region E3.

By setting a great lever ratio in the initial operation region E2, the inventive example can increase the output (pressing force) of the push rod 86 shown in FIG. 3 even when the leg power applied to the brake pedal 12 is small. Thus, a sufficient fluid pressure for moving the first piston 37 can be produced in the fluid chamber 39 shown in FIG. 2.

Thus, as soon as the human driver starts applying a small leg power to the brake pedal 12 in the initial operation region E2, the first piston 37 can be caused to move against the cup seal sliding resistance, biasing force of the first spring 40, etc. Namely, as indicated by the curve G4 of FIG. 6, as soon as the human driver starts applying a leg power to the brake pedal 12, the first piston 37 can be start to move against the cup seal sliding resistance, biasing force of the first spring 40, etc.

As the human driver gradually increases the leg power to be applied to the brake pedal 12, the inventive example allows the first piston 37 to smoothly move in response to the gradual increase in the leg power.

Further, by lowering the lever ratio in the mid operation region E3, the inventive example can lower the output (pressing force) of the push rod 86 shown in FIG. 2. Thus, when the first piston 37 is to be switched to the state where it is movable against the biasing forces of the first spring 40 and second spring 43, the first and second pistons 37 and 38 can be moved smoothly, as indicated by the curve G4.

In addition, by increasing the great lever ratio in the final operation region E4, the inventive example can increase the output (pressing force) of the push rod 86 shown in FIG. 3.

Thus, the moving speed, in the final operation region E4, of the first piston 37 can be controlled to agree with the moving speed in the mid operation region E3.

In the aforementioned manner, the instant embodiment of the brake apparatus 10 permits reduction of the leg power to be applied by the human driver to the brake pedal 12 in the initial operation region E2 and permits smooth movement of the first and second pistons 37 and 38 in an operation phase from the initial operation region E2 through to the final operation region E4. As a result, the instant embodiment of the brake apparatus 10 can advantageously secure a good operational feeling of the brake pedal 12.

Next, with reference to FIG. 7, a description will be given about a second embodiment of the brake apparatus. Similar elements to those in the first embodiment are indicated by the same reference numerals and characters as used for the first embodiment and will not be described here to avoid unnecessary duplication.

Figure 7:
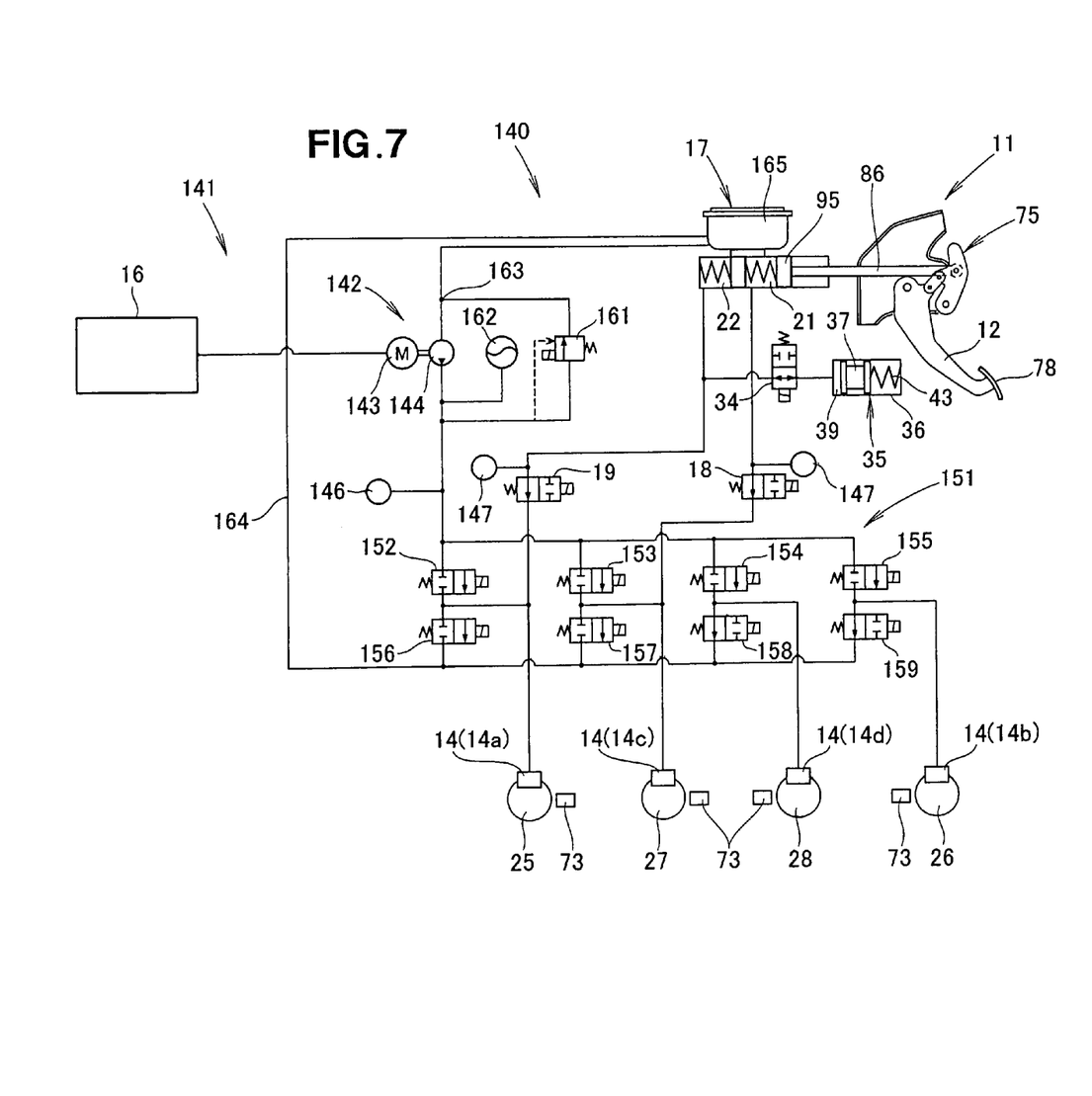
FIG. 7 is a diagram showing a fluid pressure circuit of a second embodiment of the brake apparatus of the present invention.

FIG. 7 is a diagram showing a fluid pressure circuit of the second embodiment of the brake apparatus 140 of the present invention. The brake apparatus 40 includes: the brake pedal device 11 having the brake pedal 12 incorporated therein, the brake cylinders 14 for applying a braking force to the wheels of the vehicle; an electric braking-force control device 141 capable of electrically controlling the braking force in accordance with an operation amount or leg power (operating force) of the brake pedal 12; the master cylinder 17 for producing a pressure of a brake fluid in response to operation of the brake pedal 12; the operation amount simulator 35 for storing a brake fluid supplied form the master cylinder 17; and the block valves (block members) 18 and 19 for blocking communication of the brake fluid between the master cylinder 17 and the brake cylinders 14.

The electric braking-force control device 14 includes an electric braking-force production section 142 for producing a braking force in response to operation of the brake pedal 12, and the control section 16 for controlling the braking-force production section 142 in accordance with the operation amount or operating force of the brake pedal 12.

The braking-force production section 142, which produces a braking force by an electromagnetic force, includes a pump motor 143 that is driven on the basis of a signal given from the control section 16, and a pump 144 that is driven by the pump motor 143.

The following lines describe behavior of the second embodiment of the brake apparatus 140. As a leg power is applied to the brake pedal 12, the block valves 18 and 19 are closed and the reactive-force permitting valve 34 is opened. By the block valves 18 and 19 being closed, the brake cylinders 14 are cut off from the master cylinder 17. Further, by the reactive-force permitting valve 34 being opened, the fluid pressure produced in the first fluid pressure chamber 22 of the master cylinder 17 is delivered to the fluid chamber 39 of the operation amount simulator 35 by way of the reactive-force permitting valve 34.

The first and second pistons 37 and 38 of the operation amount simulator 35 are moved by the delivered fluid pressure against the biasing forces of the first and second springs 40 and 43 (see FIG. 2 for the second piston 38 and the first spring 40).

In this way, not only an operation amount of the brake pedal 12 is permitted but also a simulated reactive force of the brake pedal 12 can be created, so that an uncomfortable feeling of the human driver can be eliminated.

At the same time, the pump 144 is driven by the pump motor 143 of the braking-force production section 142, so that an increased fluid pressure is delivered to the brake cylinders 14 to activate the disk brake devices 25, 27, 28 and 26. In the braking-force production section 142, the pump motor 143 is controlled so that a fluid pressure detected by a fluid pressure sensor 146 is kept within a preset range.

During operation of the disk brake devices 25, 27, 28 and 26, the leg power (i.e., requested braking force) applied to the brake pedal 12 is detected on the basis of a fluid pressure detected by a fluid pressure sensor 147. Then, a fluid pressure to be applied to the brake cylinders 14 is determined so that a braking force corresponding to the detected leg power can be obtained.

Then, a fluid pressure control valve device 151 (namely, pressure-increasing linear valves 152-155 and pressure-reducing linear valves 156-159) is controlled in such a manner that the actual fluid pressure acting on the brake cylinders 14 agrees with the determined fluid pressure.

It is possible that, during a braking operation of the brake apparatus 140, some of the wheels will present an increased slip ratio to get into a lock tendency. In this case, that the wheel has gotten into a lock tendency is detected on the basis of the output of the wheel speed sensors 73.

When such a wheel lock tendency has been detected, ABS control is performed by the fluid pressure control valve device 151. Namely, when some of the wheels has gotten into a lock tendency, the instant embodiment causes a maximum braking force to be produced while limiting the lock of the wheel, by controlling the individual pressure-increasing linear valves 152-155 and pressure-reducing linear valves 156-159.

Upon satisfaction of an air discharge permission condition to allow air to be discharged from the liquid pressure circuit of the brake apparatus 140, not only a relief valve 161 is switched to an open state, but also the individual pressure-increasing linear valves 152-155 and pressure-reducing linear valves 156-159 are switched to an open state. Simultaneously, the pump 144 is driven by the pump motor 143.

Thus, an accumulator 162 and connection section 163 are brought into fluid communication with each other, so that a high-pressure operating fluid is emitted from the accumulator 162 through the pump 144. The thus-emitted operating fluid is supplied to a reservoir 165 of the master cylinder 17 by way of the pressure-increasing linear valves 152-155, pressure-reducing linear valves 156-159 and pressure reducing path 164, so that air is discharged from the reservoir 165. The aforementioned air discharge control is brought to an end upon satisfaction of an air discharge end condition.

The above-described second embodiment of the brake apparatus 140 of the present invention, which is provided with the brake pedal device 11 and operation amount simulator 35, can attain the same advantageous benefits as the first embodiment of the brake apparatus 10 of the present invention.

Whereas the first and second embodiments 10 and 140 have been described above in relation to the case where the transmission unit 75 of the brake pedal device 11 uses a link mechanism to permit variation of the lever ratio, the present invention is not so limited, and the lever ratio may be varied via any suitable mechanism, other than the link mechanism, employing a gear, cam or the like. In another alternative, the lever ratio may be varied via a construction where a pivot point of a link or output point of the push rod is moved by an actuator.

Further, whereas the first and second embodiments 10 and 140 have been described above as using the brake pedal 12 of the pendant type, the present invention is not so limited, and the brake pedal may be of a so-called organ type mounted on a vehicle floor section. Furthermore, although the brake pedal 12 has been described above as the operation member of the brake apparatus, the present invention is not so limited, and it may use a manually-operable operation lever.

Furthermore, whereas the first and second embodiments 10 and 140 have been described above as using the block valves 18 and 19 as blocking members, the blocking members may be other than the block valves 18 and 19. For example, the ports 55a and 55b of the cylinder body 42 shown in FIG. 1 may be used as the blocking members in place with the block valves 18 and 19 as long as the ports 55a and 55b permit kickback during the ABS control etc. by being closed with the respective pistons 51 and 52.

The present invention is well suited for use in automotive vehicles provided with a brake apparatus having an operation member and master cylinder interconnected via a transmission unit.

Obviously, various minor changes and modifications of the present invention are possible in light of the above teaching. It is therefore to be understood that within the scope of the appended claims the invention may be practiced otherwise than as specifically described.

What is claimed is:

1. A brake apparatus comprising:
    an operation member;
    a brake cylinder;
    an electric braking-force control device for electrically controlling a braking force in accordance with an operation amount or force of the operation member;
    a master cylinder for producing a pressure of a brake fluid;
    a transmission unit for operatively connecting the operation member to the master cylinder;
    a simulator for storing the brake fluid supplied from the master cylinder; and
    a block member for blocking communication of the brake fluid between the master cylinder and the brake cylinder,
    wherein the transmission unit is a mechanism capable of varying a ratio between an output amount of an output member thereof connected to the master cylinder and the operation amount of the operation member, and
    wherein, in an initial operation region from an initial operating position of the operation member to another operating position of the operation member that corresponds to a predetermined operation amount of the operation member, a ratio of the operation amount of the operation member to the output amount of the output member is set to be greater than in another operation region immediately following the initial operation region.

2. The brake apparatus of claim 1, wherein the transmission unit is connected directly to the master cylinder.

3. The brake apparatus of claim 1, wherein the transmission unit includes a pivot link connected via the output member to the master cylinder, and a connection link interconnecting the pivot link and the operation member, and wherein the connection link is arranged to be pulled away from the pivot link by the operation member as the operation member is operated in a non-operating position thereof.

* * * * *